(12) United States Patent
LeBlanc et al.

(10) Patent No.: US 8,646,645 B1
(45) Date of Patent: *Feb. 11, 2014

(54) PRECISION POUR DRINK SHAKER

(71) Applicant: Tin Play, LLC, San Diego, CA (US)

(72) Inventors: Jeremy M. LeBlanc, San Diego, CA (US); Chad A. Berkey, San Diego, CA (US)

(73) Assignee: Tin Play, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,674

(22) Filed: Apr. 2, 2013

Related U.S. Application Data

(63) Continuation of application No. 13/549,457, filed on Jul. 14, 2012, which is a continuation of application No. 12/720,316, filed on Mar. 9, 2010, now Pat. No. 8,225,956.

(60) Provisional application No. 61/172,464, filed on Apr. 24, 2009.

(51) Int. Cl.
*A47J 43/00* (2006.01)

(52) U.S. Cl.
USPC .......................................................... 220/568

(58) Field of Classification Search
USPC .................. 220/568, 717, 716, 715, 703, 662
See application file for complete search history.

(56) References Cited

U.S. PATENT DOCUMENTS

| | | | | |
|---|---|---|---|---|
| 253,451 | A * | 2/1882 | Ward .............................. | 220/568 |
| 710,708 | A * | 10/1902 | McShane ....................... | 215/365 |
| 898,701 | A * | 9/1908 | Tate .............................. | 222/129 |
| 924,969 | A * | 6/1909 | De Wolf ......................... | 73/426 |
| 1,967,469 | A | 7/1934 | Dulany | |
| 2,010,725 | A * | 8/1935 | Kircher ......................... | 220/568 |
| 2,090,320 | A | 8/1937 | Amick | |
| 2,592,485 | A * | 4/1952 | Stair .............................. | 366/130 |
| 2,627,184 | A * | 2/1953 | Thompson ...................... | 73/427 |
| 2,801,541 | A * | 8/1957 | Moreland ....................... | 73/319 |
| 3,327,911 | A * | 6/1967 | Candito ......................... | 222/572 |
| 3,471,075 | A * | 10/1969 | Wolf .............................. | 229/400 |
| 3,920,226 | A * | 11/1975 | Walt .............................. | 366/130 |
| 3,985,346 | A | 10/1976 | Merz | |
| 4,003,555 | A | 1/1977 | Swartz | |
| 4,872,764 | A * | 10/1989 | McClean ....................... | 366/251 |
| 5,605,089 | A * | 2/1997 | Yu .................................. | 99/306 |
| 5,788,369 | A * | 8/1998 | Tseng ........................... | 366/130 |
| D412,806 | S | 8/1999 | Pierce | |
| 6,159,513 | A | 12/2000 | Judlowe et al. | |
| D483,982 | S | 12/2003 | Irvine | |
| D495,186 | S | 8/2004 | Poupel et al. | |
| D498,966 | S | 11/2004 | Fiedeler et al. | |
| 6,913,165 | B2 * | 7/2005 | Linz et al. ..................... | 220/568 |
| 7,472,595 | B2 * | 1/2009 | Ploix .............................. | 73/426 |
| 7,959,346 | B2 * | 6/2011 | Loden ........................... | 366/130 |
| 2002/0179615 | A1 * | 12/2002 | Hakim .......................... | 220/714 |

(Continued)

*Primary Examiner* — Steven A. Reynolds
*Assistant Examiner* — King M Chu
(74) *Attorney, Agent, or Firm* — Clause Eight IPS; Michael Catania

(57) ABSTRACT

A precision pour drink shaker is disclosed herein. The precision pour drink shaker includes a first means for containing one or more liquids, and a second means for measuring an amount of matter placed into the first means. In one aspect, the first means may include a shaker and the second means may include a post extending from the first means, for example, from an interior surface of a base of the first means.

5 Claims, 16 Drawing Sheets

(56) References Cited

U.S. PATENT DOCUMENTS

| | | | |
|---|---|---|---|
| 2006/0032855 A1* | 2/2006 | Hinkle | 220/703 |
| 2006/0266755 A1* | 11/2006 | Hollis et al. | 220/703 |
| 2007/0227245 A1* | 10/2007 | Green et al. | 73/428 |
| 2010/0011855 A1* | 1/2010 | Yip | 73/426 |

* cited by examiner

PRECISION POUR DRINK SHAKER

CROSS REFERENCE TO RELATED APPLICATION

The present application is a continuation application of U.S. patent application Ser. No. 13/549,457, filed on Jul. 14, 2012, which is a continuation application of U.S. patent application Ser. No. 12/720,316, filed on Mar. 9, 2010, now U.S. Pat. No. 8,225,956, issued on Jul. 24, 2012, which claims priority to U.S. Provisional Patent Application No. 61/172,464, filed on Apr. 24, 2009, now abandoned, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention relates generally to a drink shaker. More particularly, this application relates to a drink shaker configured to facilitate accurate pours and flair bartending trick pours.

2. Description of the Related Art

Shakers are used to combine alcoholic beverages with one or more mixers (e.g., soft drinks or juices) to form a variety of cocktails. Existing drink shakers or shaker "tins" are often made of metal, for example, stainless steel. Various liquids and ice can be added to a shaker to create a cooled drink.

Flair bartending is the practice of entertaining guests or customers with the manipulation of bar tools, for example, drink shakers and/or liquor bottles. Some flair bartenders incorporate juggling into their routines and others mix and pour multiple drinks at once, sometimes by stacking shakers on top of one another. Flair bartending can attract customers and improve the overall experience for clientele at an establishment that serves drinks, for example, cocktails. Additionally, there are flair bartending competitions, for example, the Legends of Bartending World Bartender Championship held annually in Las Vegas, Nev. At the Legends of Bartending World Bartender Championship, contestants are judged on, among other things, flair as well as accuracy. Accuracy requires the competing bartender to measure the quantities being poured without actually using a measuring cup or similar tool. For both flair bartending and normal bartending practices, accuracy is important to bar managers and owners because over-pouring wastes drinks (for example, alcohol) and results in diminished profits. Similarly under pouring requires the bartender to remake a drink, wasting valuable time. Using existing shakers and devices a bartender may combine the ingredients of a drink or beverage into the shaker and miscalculate the measurements, resulting in an over-pour or under-pour.

Thus, an improved shaker that facilitates accurate pours while aiding flair or trick pouring is needed.

BRIEF SUMMARY OF THE INVENTION

The devices of the invention each have several aspects, no single one of which is solely responsible for its desirable attributes. Without limiting the scope of this invention, its more prominent features will now be discussed briefly. After considering this discussion, and particularly after reading the specification one will understand how the features of the embodiments described herein provide advantages over other drink shakers.

According to one embodiment, a device having a container comprises a base having a first diameter and a side-wall connected to the base to encircle at least a portion of the base, the side-wall extending from the base to form an enclosure with a first height, the enclosure having an opening opposite the base, and a measuring structure coupled to an interior surface of the base, the measuring structure having a second diameter and a second height. In one aspect, the side-wall includes a spout configured to aid pouring from the device and reduce spills. In one aspect the first height can be about 7 inches and the second height can be about 3.75 inches. In another aspect, the measuring structure may comprise a post and may be coupled to the base. In some aspects the measuring structure is removable, attached to the base with a suction cup, or the measuring structure and base may be threadably engaged.

According to another embodiment, the invention includes a container for mixing liquids. The container may comprise a base having a first diameter, an interior surface, and an exterior surface, a lower portion formed of a first material, the lower portion having a proximate edge coupled to the base and a distal edge, the lower portion having an interior surface and an exterior surface, a middle portion formed of a second material, the middle portion having a proximate edge coupled to the distal edge of the base and a distal edge, the middle portion having an interior surface and an exterior surface, a top portion formed of a third material, the top portion having a proximate edge coupled to the distal edge of the middle portion and a distal edge that defines an opening opposite the base, the top portion having an interior surface and an exterior surface, and a post extending from the interior surface of the base, the post having a second diameter and a tip, the tip being disposed between the distal and proximate edges of the middle portion. In one aspect the second material may be substantially translucent or transparent and/or be made from plastic. In another aspect the first material may be stainless steel and/or may be the same as the third material. In an aspect, the second diameter may be less than the first diameter. In one aspect, the container may also include a movable ring partially or completely circumscribing the post. The ring may be configured to move between at least the base and the tip of the post. The ring may include a gasket that may be used to hold the ring in a location on the post. In another aspect the post comprises threads and the movable ring is configured to engage with the threads to move along the post.

According to another embodiment, a device for mixing liquids includes a first means for containing one or more liquids, and a second means for measuring an amount of matter placed into the first means. In one aspect, the first means may include a shaker and the second means may include a post extending from the first means, for example, from an interior surface of a base of the first means.

In another embodiment, a device for mixing liquids includes a container having an interior surface, an exterior surface, a base having a first diameter, a lip defining an opening opposite the base, and a first height measured from the interior surface of the base to the opening, and means for measuring an amount of matter added to the container. In one aspect, the means for measuring extends from the interior surface of the container. In another aspect, the means for measuring comprises an indentation in the interior surface of the container.

DETAILED DESCRIPTION OF THE INVENTION

The following detailed description is directed to certain specific embodiments of the invention. However, the invention can be embodied in a multitude of different ways. For example, different features may be incorporated in drink shakers to facilitate accurate pours and flair bartending tricks. In this description, reference is made to the drawings wherein like parts are designated with like numerals throughout.

In various embodiments described herein, a drink shaker or container includes a primary measuring structure positioned within the shaker. The primary measuring structure preferably extends from an interior surface of the shaker, for example, the interior surface of the base of the shaker. In one embodiment, the primary measuring structure is a post which extends vertically from the bottom interior surface of the shaker. The height of the post preferably is configured to provide a measuring guide for a bartender. For example, a bartender fills the shaker with ice and liquid up to about the tip of the post in order to mix an accurate volume of liquid for a particular drink (e.g., a martini or shot). The height of the post preferably also is configured to facilitate the stacking of shakers and allow multiple drinks to be poured simultaneously from the stacked shakers. In some embodiments, one or more secondary measuring structures are coupled with the primary measuring structure to provide a bartender with easy to see structural indicators of multiple heights, each measuring structure corresponding to a different drink. For example, filling the shaker with ice and liquid to the height of the top of the primary measuring structure results in an accurate pour for a martini. Filling the shaker with ice and liquid to the height of the secondary measuring structure results in an accurate pour for a shot. In one embodiment, a secondary measuring structure preferably includes a ring circumscribing the primary measuring structure. In some embodiments, a drink shaker includes other measuring structures to facilitate accurate pours and stacking, for example, annular rings, protrusions, bumps, indentations, rods, columns, grooves, pits, or similar structures.

Figure 1:
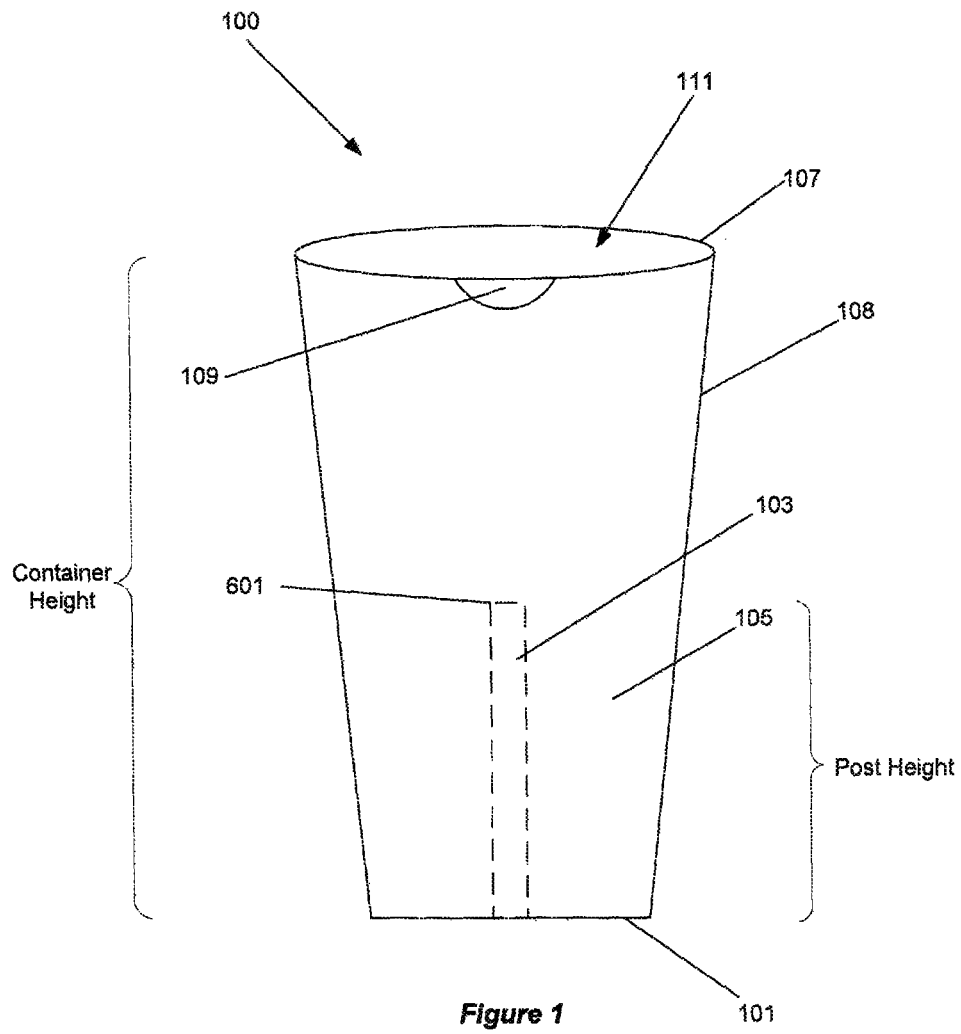
FIG. 1 is a side view schematically illustrating an embodiment of a drink shaker that includes a measuring structure disposed within the shaker (e.g., a post) configured to measure an amount of liquid and ice added to the shaker and facilitate flair bartending practices.

FIG. 1 illustrates a drink shaker 100 that includes a container 105 and a measuring structure (e.g., a post) 103 disposed within the container and coupled to the container 105 according to one embodiment. The container 105 preferably includes a base 101 and a side-wall 108 extending from the base 101 to form an enclosure configured to hold a volume of liquid and/or ice. The base 101 can be any shape. In some embodiments, the base 101 is curvilinear, for example, circular. In other embodiments, the base 101 is polygonal, for example, square, rectangular, or triangular. The base 101 may be formed of various materials. Examples of suitable materials include transparent plastics, colored plastics, rubbers, carbon fiber, composite materials, metals (e.g., stainless steel), glass, ceramics, and organic materials. The size of the base 101 varies depending on the size of the container 105 and the amount of liquid and or ice intended to be held within the container 105. In some embodiments, the base 101 is curvilinear with a diameter between about 2 inches and about 5 inches. In other embodiments, the base 101 is rectangular with a surface area of between about 9 inches and about 36 inches.

The side-wall 108 preferably extends from the base 101 near the perimeter of the base 101 or from within the perimeter of the base 101. The side-wall 108 preferably extends from the base forming a container 105 height. The height of the container 105 is preferably sized such that the container 105 holds a certain amount of matter, for example, liquid and ice. In one embodiment, the container is sized to hold more than 4 fluid ounces of liquid and ice. The shape of the side-wall 108 can vary. In some embodiments, the side-wall 108 is generally curvilinear, for example, cylindrical. In other embodiments, the side-wall 108 is multi-sided. The cross-sectional shape of the side-wall 108 is preferably similar to the shape of the base 101 or alternatively the side wall 108 is different, for example, the shape of the base 101 is circular and the cross-section of the side-wall 108 is circular. In another example, the shape of the base 101 is circular and the cross-section of the side-wall 108 is octagonal. The side-wall 108 is preferably formed of the same material(s) as the base 101 or alternatively the side wall 108 and base 101 are different materials. In one embodiment, the base 101 is formed of stainless steel and the side-wall 108 is stainless steel. In another embodiment, the base 101 is formed of stainless steel and the side-wall 108 is formed at least partly with plastic.

An edge of the side-wall 108 preferably forms a lip 107 that is disposed distal from the base 101. The lip 107 defines an opening or aperture 111. In some embodiments, the opening 111 lies on a plane that is parallel to a plane that the interior surface of the base 101 lies on. The shape of the opening 111 can vary, for example, the opening 111 may be curvilinear or polygonal. In some embodiments the shape of the opening 111 is similar to the shape of the base 101 and/or the cross-sectional shape of the side-wall 108. The size of the opening 111 can also vary. In some embodiments, the opening 111 and base 101 are each circular and the size of opening 111 is greater than the size of the base 101 such that the side-wall 108 tapers from the opening 111 to the base 101. In some embodiments, the lip 107 includes an optional spout 109 to facilitate pouring from the container 105.

The measuring structure 103 is preferably coupled to any interior surface of the container 105. In FIG. 1, for example, the measuring structure 103 is attached to the interior surface of the base 101. In other embodiments, the measuring structure 103 is coupled to an interior surface of the side-wall 108. The measuring structure 103 preferably includes a tip 601 on the distal end of the measuring structure. The measuring structure 103 preferably forms a height measured between the base 101 of the container 105 and the tip 601. In some embodiments, the height formed by the measuring structure 103 is less than the height of the container 105.

The shape of the measuring structure 103 may vary. The cross-sectional shape of the measuring structure 103 can be curvilinear or polygonal. In some embodiments, the cross-sectional shape of the measuring structure 103 can vary along the length of the structure. Examples of measuring structures 103 include, but are not limited to, posts, columns, cubes, boxes, bars, points, bump, pipes, tubes, stakes, stilts, studs, rails, masts, or poles. In an embodiment, the measuring structure 103 includes a post with a certain diameter along the length of the post. In an embodiment, the measuring structure 103 comprises a post with a diameter of about 0.25 inches. In some embodiments, the measuring structure 103 is tapered or may otherwise vary along the length of the structure 103. The cross-sectional area of the measuring structure 103 is preferably less than the area of the base 101 and/or opening 111. The height of the measuring structure 103 is preferably configured based on the volume of the mixed drink to be shaken in and poured from the shaker 100. In one example, the measuring structure 103 includes a post with a height of about 3.75 inches.

The measuring structure 103 comprises any suitable material, for example, rubber, glass, metal, stainless steel, organic material, plastic, and/or composite material. The measuring structure 103 is preferably formed of the same material as the base 101 and/or side-wall 108, or alternatively the measuring structure 103 is formed of a different material. For example, in an embodiment, the measuring structure 103 comprises a stainless steel post attached to a stainless steel base 101. The measuring structure 103 is coupled or attached to any interior surface of the container 105 using any suitable form of attachment. For example, the measuring structure 103 is adhered, glued, welded, bonded, or fastened to an interior surface of the container 105 (e.g., the base 101 or side-wall 108). In some embodiments, parts of the container 105 is formed from one uniform piece of material. For example, the base 101 and measuring structure 103 are an integral piece of plastic or stainless steel machined down from a larger original piece.

The shaker 100 optionally includes a light source (not shown), for example, one or more light emitting diodes (LEDs). The light source is preferably coupled to the side-wall 108, the base 101, and/or the measuring structure 103. In one embodiment, the measuring structure 103 is formed of a transparent material and includes one or more LEDs within the measuring structure. In some embodiments, multiple light sources are disposed vertically along or inside a vertically aligned measuring structure. The light source is preferably powered by a battery that is disposed near the light source, for example, in the base 101. In some embodiments, the battery is disposed inside the measuring structure. The light source provides a great visual effect while illuminating the contents of the shaker 100. In some embodiments, a light source is connected to a switch, for example, a pressure plate, that activates the light source when the shaker 100 is shaken or when ice or ingredients apply a predetermined amount of pressure on the switch. A shaker 100 with a light source is especially useful in locations with low levels of light and may facilitate accurate pours.

In operation, a bartender fills a container 105 with ice up to the tip 601 of the measuring structure 103, pours one or more liquids into the container such that the ice does not rise above the tip 601 of the measuring structure 103, shakes or muddles the ingredients to mix the liquids and ice together, and pours the mixed liquid from the container 105. The volume of the mixed drink poured depends on the height and cross-sectional area of the measuring structure 103 and the dimensions of the container 105, for example, the diameters of the base 101 and the opening 111. Thus, the shaker 100 is configured to accurately mix and pour any particular volume of liquid to make certain drinks based on the dimensions of the container 105 and the position or height of the measuring structure. In one embodiment, the shaker 100 is configured to accurately mix and pour a 14 ounce martini. In another embodiment, the shaker 100 is configured to accurately mix and pour and 8 ounce martini. In another embodiment, the shaker 100 is configured to accurately mix and pour a shot.

Figure 2:
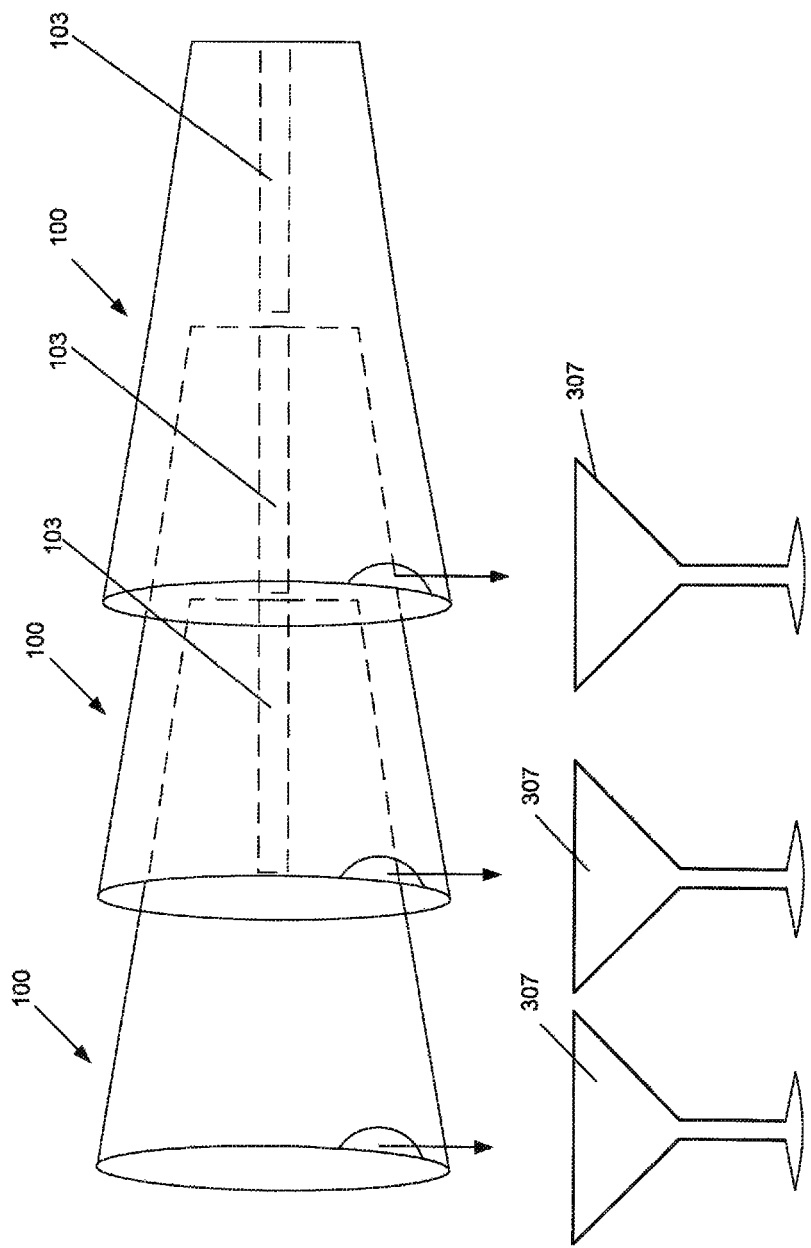
FIG. 2 is a side view schematically illustrating three of the drink shakers shown in FIG. 1 stacked on top of one another and simultaneously pouring three separate drinks.

Turning now to FIG. 2, the shaker 100 shown in FIG. 1 is stacked or combined with other shakers 100 to simultaneously pour multiple drinks. For example, three drinks are prepared in three separate shakers 100, the shakers 100 are stacked on top of one another, and the three drinks are simultaneously poured into three glasses 307. To stack the shakers 100 on top of one another, the base 101 of a first shaker 100 is inserted into the opening 111 of a second shaker 100 until the base 101 of the first shaker contacts the tip 601 of the measuring structure 103 of the second shaker. A third shaker 100 is then be stacked on top of the first shaker 100 by inserting the base 101 of the third shaker into the opening 111 of the first shaker until the base of the third shaker contacts the measuring structure 103 of the first shaker. Stacking multiple shakers 100 on top of each other is an improvement over existing multiple pour tricks where shakers are supported by melting ice because the measuring structures 103 will be at consistent heights, unlike melted ice.

In one embodiment, the measuring structures 103 and containers 105 are dimensioned such that when multiple shakers 100 are stacked on one another, the lips 107 are offset from each other by a certain distance. This distance can be determined by the height or position of the measuring structure. The distance between lips 107 on stacked shakers 100 can be chosen based off of the distance in between the centers of the glasses 307 that the shakers 100 are pouring drinks into. For example, in one embodiment, the distance between lips 107 on stacked shakers 100 is configured to allow a bartender to simultaneously pour a drink from each shaker 100 into a separate martini glass. In an embodiment, the distance between the lips 107 of stacked shakers 100 is between about 3.5 inches and 4.5 inches. In another embodiment, the distance between the lips 107 of stacked shakers 100 is about 5 inches to accurately pour multiple martinis into multiple martini glasses that have lips each having an approximately 5 inch diameter. Thus, a bartender may stack multiple shakers 100 that have a measuring structure 103 that aligns the shakers 100 in a predetermined position to perform flair tricks and accurately pour multiple drinks.

Figure 3:
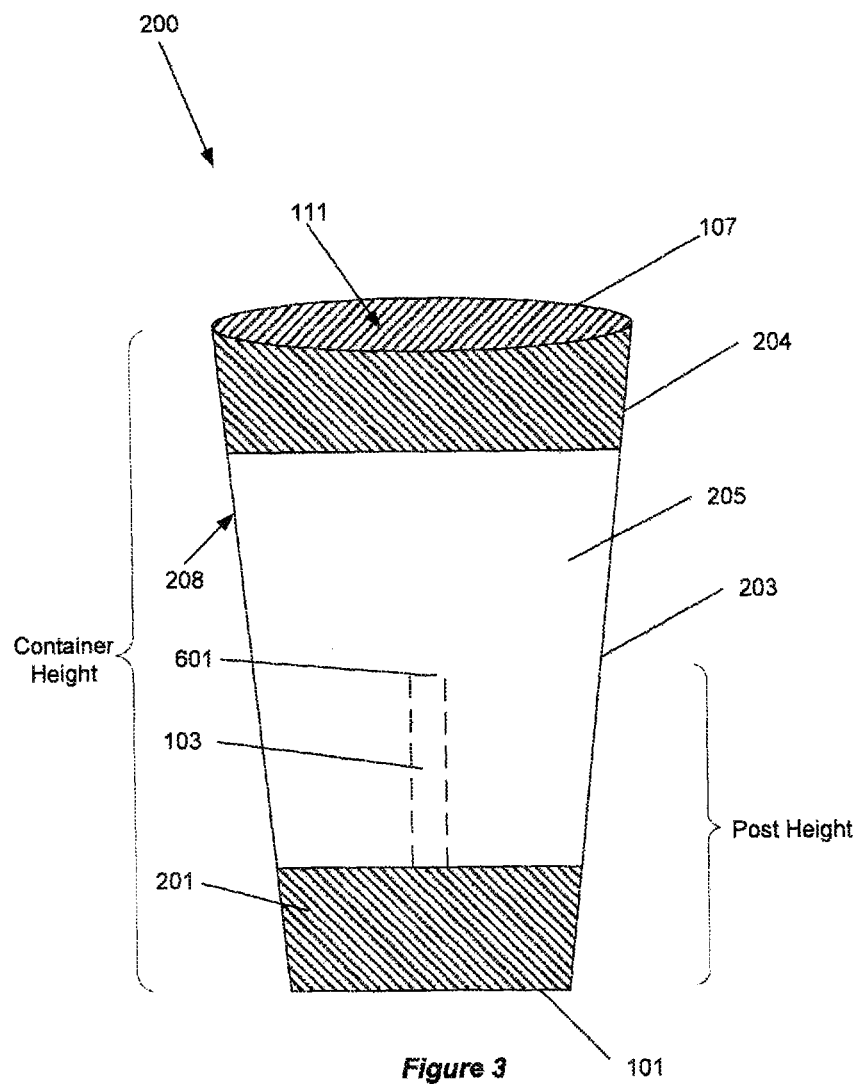
FIG. 3 is a side view schematically illustrating an embodiment of a drink shaker including a measuring structure and a transparent middle portion.
Figure 4:
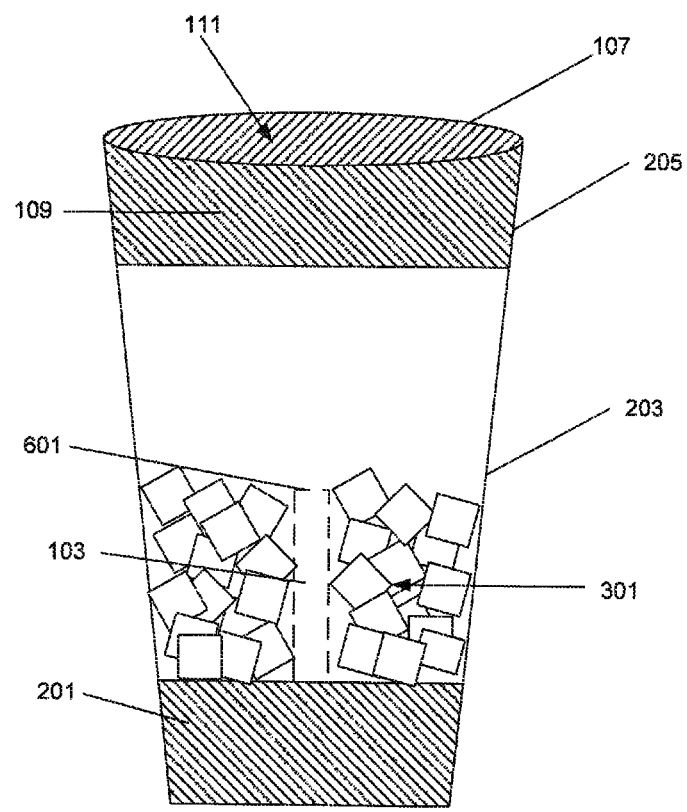
FIG. 4 is a side view schematically illustrating the drink shaker shown in FIG. 3 with ice added to the shaker up to about the tip of the measuring structure.
Figure 5:
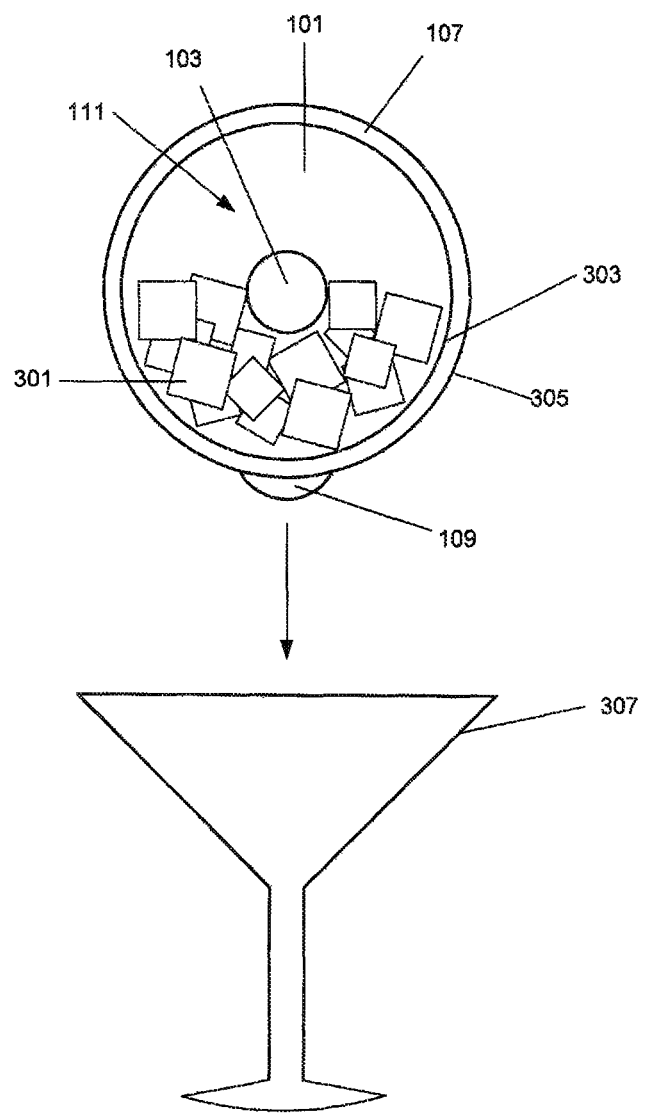
FIG. 5 schematically illustrates a top view of the drink shaker shown in FIG. 4 as a mixed drink is being poured from the shaker to a glass.

Turning now to FIGS. 3-5, another embodiment of a drink shaker 200 is depicted that includes a container 205 and a measuring structure 103 disposed within the container and coupled to an interior surface of the container 105. The container 105 preferably includes a base 101 and a side-wall 208 that extends from the base 101 to form an enclosure configured to hold a volume of matter, for example, liquid and/or ice. The side-wall 208 preferably includes one or more sections or portions including a lower-side portion 201, a middle-side portion 203, and an upper-side portion 204. The lower-side portion 201, middle-side portion 203, and upper-side portion 204 are preferably similarly shaped or differently shaped. For example, the lower-side portion 201, middle-side portion 203, and upper-side portion 204 are each generally cylindrical.

The lowers-side portion 201, the middle-side portion 203, and the upper-side portion 204 are preferably formed of any suitable materials, for example, metal (e.g., stainless steel), glass, plastic (opaque or transparent), composite materials, and/or organic materials. The lower-side portion 201, middle-side portion 203, and upper-side portion 204 are preferably formed of similar materials or different materials. For example, the lower-side portion 201 is formed of stainless steel, the middle-side portion 203 is formed of a transparent material (e.g., plastic), and the upper-side portion 204 can be formed of an opaque material (e.g., stainless steel). Also, the height of each portion may vary or the height of each portion of the side-wall 208 may be about the same. For example, the height of the lower-side portion 201 is preferably about 1.5 inches, the height of the middle-side portion 203 is preferably about 4 inches, and the height of the upper-side portion 204 is preferably about 1.5 inches. In another embodiment, the height of each portion 201, 203, 204 is between about 2 and about 2.5 inches.

The lower-side portion 201, middle-side portion 203, and upper-side portion 204 are preferably joined or coupled together using known methods including, for example, bonding, welding, adhering, fastening, and/or soldering. The lower-side portion 201 preferably includes a proximate edge that is coupled with the base 101 and a distal edge. The distal edge of the lower-side portion 201 is preferably coupled with a proximate edge of the middle-side portion 203. A distal edge of the middle-side portion 203 is preferably coupled or joined with a proximate edge of the upper-side portion 204. The upper-side portion 204 preferably includes a distal edge that forms a lip 107. The lip 107 preferably defines an opening or aperture 111 that is configured to allow matter to enter and leave the container 205. The lip 107 also preferably includes an optional spout (not shown) that is configured to facilitate pouring from the container 205.

The container 205 preferably includes an interior surface 303 and an exterior surface 305 formed by the base 101 and the side-wall 208. The interior surface 303 is separated from the exterior surface 305 by a thickness. The thickness may vary from the base 101 to the lip 107 and may vary from container 205 to container 205. For example, a container 205 intended to hold a smaller volume of matter preferably has a smaller thickness than a container 205 intended to hold a larger volume of matter. The interior and/or exterior surface 303, 305 preferably include ornamental features (not shown) including printed on designs or graphics or light emitted diodes embedded within the surfaces 303, 305.

Embodiments of a drink shaker 200 incorporating a transparent middle-side portion 203 provide a full view of infusion or mixing of ingredients. This visibility deters bartenders from intentionally or accidentally overfilling the shaker 200 because others, for example, managers or owners, can view the contents of the shaker 200 and determine whether ingredients are being wasted. Additionally, a transparent middle-side portion 203 allows a guest or customer to view their drink in plain sight to examine the amount of each ingredient added to ensure that their drink is made to their liking and is not under-poured. Viewing the mixing or infusion of ingredients also provides a great visual effect to a customer.

Figure 6:
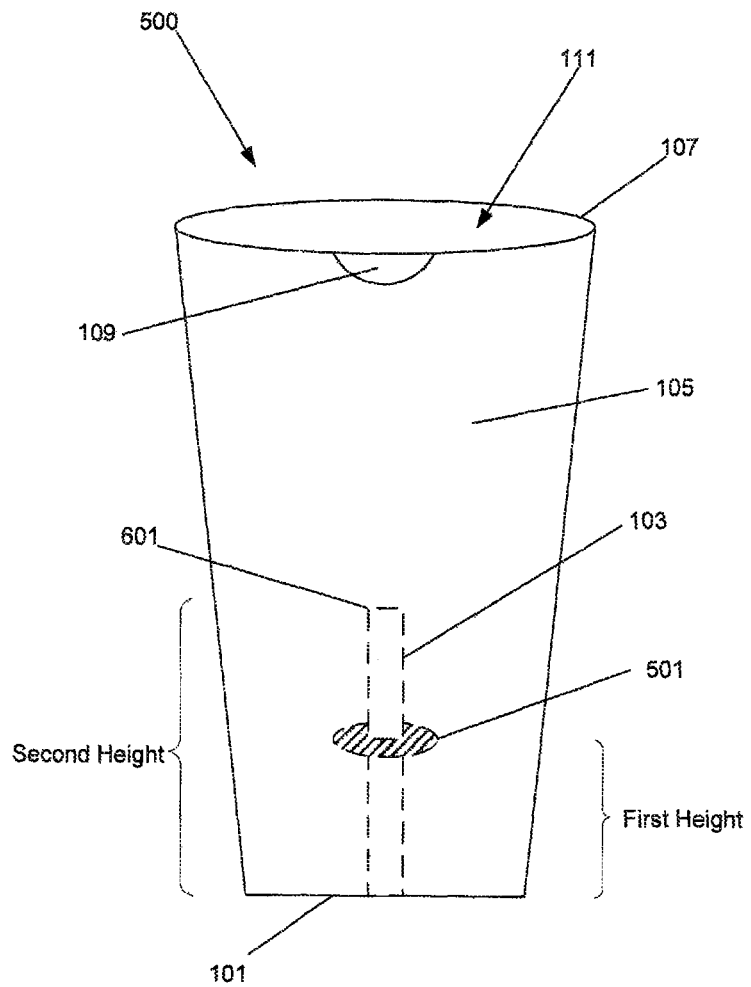
FIG. 6 is a side view schematically illustrating an embodiment of a drink shaker including a container, a measuring structure, and a movable ring coupled with the measuring structure in between the tip of the measuring structure and the base of the container.

FIG. 6 shows another embodiment of a shaker 500 including a container 105, a primary measuring structure 103, and a secondary measuring structure 501. As discussed above, the primary measuring structure 103 preferably includes a post, column, tube, stake, or pole, among other things. The secondary measuring structure 501 preferably contacts the primary measuring structure 103 and move between the base 101 and the tip 601. In one embodiment, the secondary measuring structure 501 includes a ring that partly or completely circumscribes the primary measuring structure 103. In another embodiment, the primary measuring structure includes threads (not shown) and the secondary measuring structure 501 threadably engages with the threads to move along the primary measuring structure 103. In other embodiments, the secondary measuring structure 501 includes a gasket, seal, clip, O-ring, or a mechanical fastener (e.g., nut).

The primary measuring structure 103 preferably extends from any interior surface of the container 105 including the base 101 and the side-wall 108. The secondary measuring structure 501 may be set in any position along the primary measuring structure between the tip 601 and the interior surface of the container 105 to which the primary measuring structure is attached. The distance between the base 101 and the secondary measuring structure 501 is preferably an adjustable first height. The distance between the tip 601 and the base 101 is preferably a fixed second height. The first height and the second height is determined based on the volume of two or more drinks to be mixed in the shaker 500. In one embodiment, the second height is configured to accurately pour a standard martini by providing a visual guide for a bartender to fill the shaker with ice and ingredients and the first height are adjusted to mix a shot by providing a different visual guide to the bartender.

The primary measuring structure 103 may include symbols or indicia (not shown) indicating different locations on the primary measuring structure 103 that the secondary measuring structure 501 may be set to. In one embodiment, the primary measuring structure 103 includes three colored stripes indicating three positions for the secondary measuring structure 501 to be set to. Each stripe corresponds to a different drink. Additionally, in some embodiments, a shaker 500 includes more than one secondary measuring structures 501 to form visual guides for a bartender. For example, two secondary measuring structures 501 are disposed at different points on a primary measuring structure 103 to form three visual drink guides for a bartender.

Figure 7A:
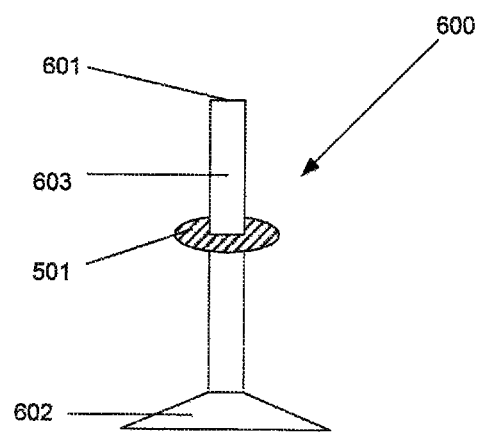
FIG. 7A is a side view schematically illustrating an embodiment of a removable measuring structure that includes a suction cup for coupling the measuring structure to a container or shaker.
Figure 7B:
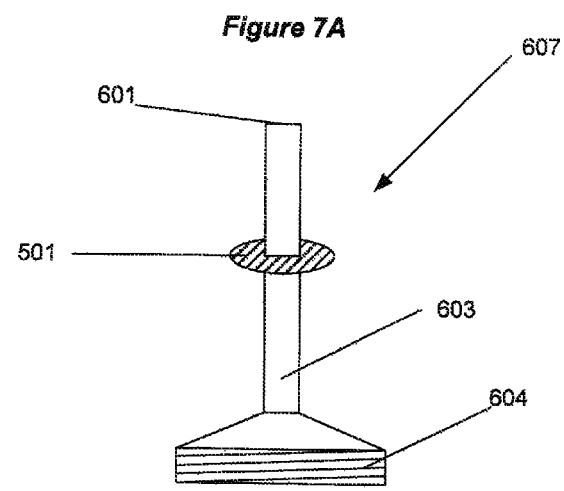
FIG. 7B is a side view schematically illustrating an embodiment of a removable measuring structure that is configured to threadably engage with a container or shaker in order to couple the removable measuring structure with the container.

Turning now to FIGS. 7A and 7B, two embodiments of removable measuring structures 600, 607 are shown. FIG. 7A shows a measuring structure 600 including a suction cup 602, post 603, and secondary measuring structure 501. The post 603 preferably extends from the suction cup 602 and the secondary measuring structure 501 preferably contacts the post 603 and move between the tip 601 and the suction cup 602. The suction cup is preferably configured to releasably attach the measuring structure 600 to a planar surface, for example, the interior surface of a container. FIG. 7B shows another embodiment of a removable measuring structure 607 including a threaded base 604, post 603, and secondary measuring structure 501. The threaded base 604 is configured to releasably attach the post 603 to another object, for example, a container. In one embodiment, the measuring structure 607 is coupled with a container, for example, a stainless steel container, by threadably engaging the base 604 with the container. The measuring structures 600, 607 are releasably attached to existing containers to facilitate accurate pours and/or flair bartending tricks with containers that do not include measuring guides or similar structure.

Figure 8:
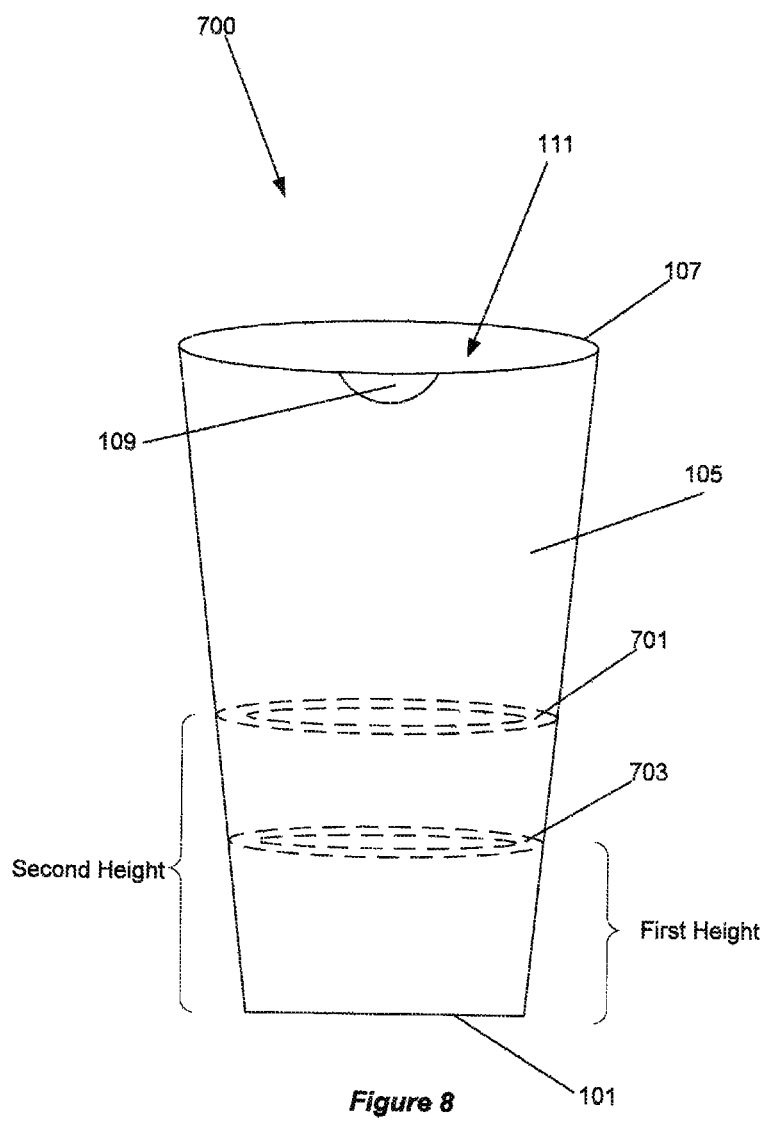
FIG. 8 is a side view schematically illustrating an embodiment of a drink shaker including two annular rings extending from the inside of the shaker to facilitate accurate pours and flair bartending practices.
Figure 9:
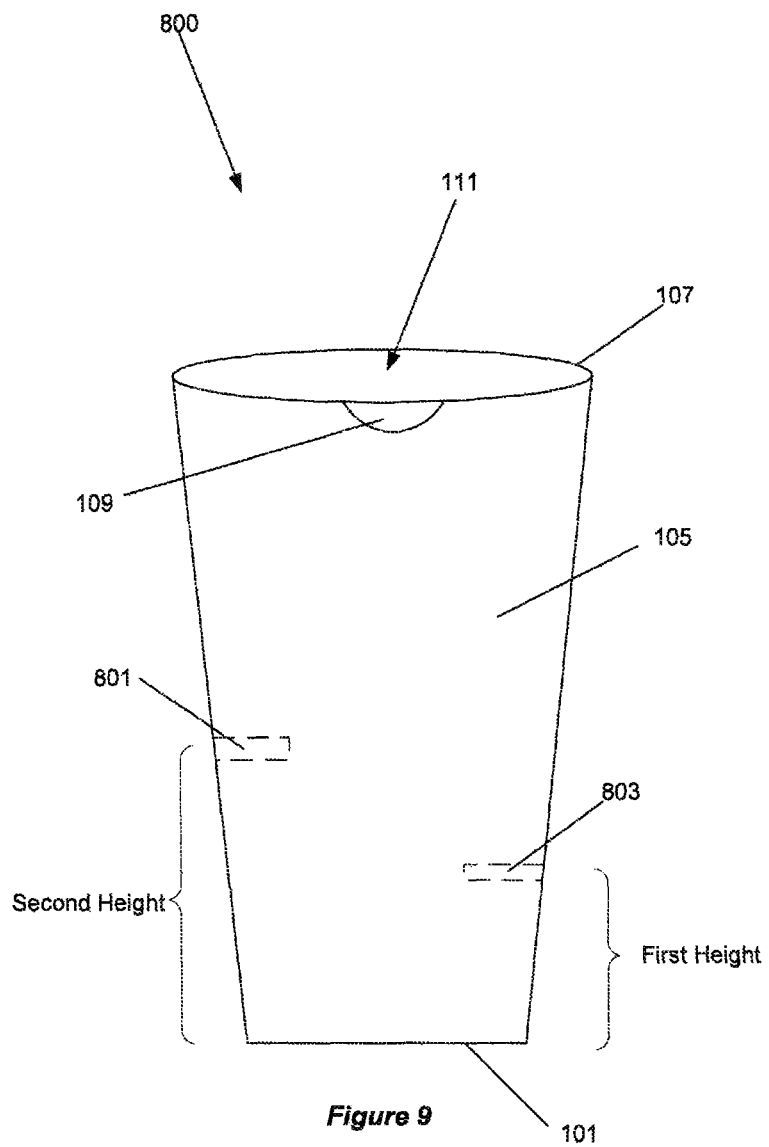
FIG. 9 is a side view schematically illustrating an embodiment of a drink shaker including two protrusions extending from the inside of the shaker to facilitate accurate pours and flair bar tending practices.
Figure 10:
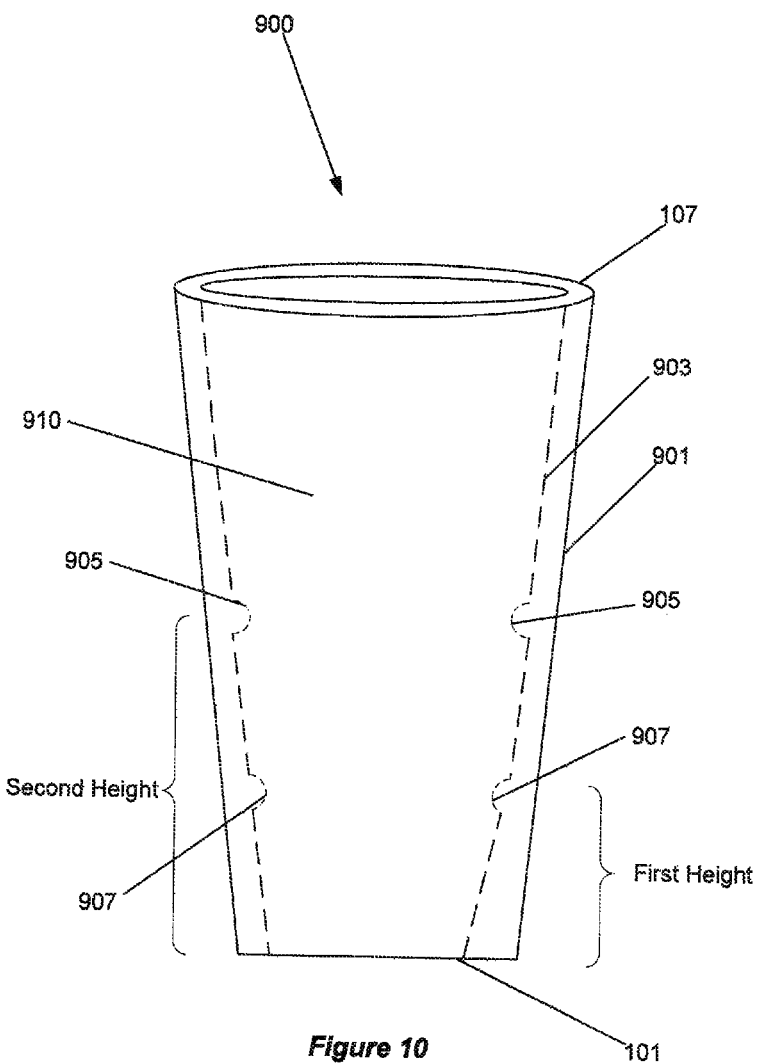
FIG. 10 is a side view schematically illustrating an embodiment of a drink shaker including an inner wall with multiple measuring structures (e.g., bumps) on the inner wall of the shaker to facilitate accurate pours and flair bartending practices.

FIGS. 8-10 illustrate various embodiments of shakers 700, 800, 900 configured to facilitate accurate drink pours and flair bartending tricks. FIG. 8 shows an embodiment of a drink shaker 700 including a container 105 and one or more measuring structures here embodied as two annular rings 701, 703 extending from an interior surface of the container. The annular rings 701, 703 are formed of any suitable material including, transparent plastic, colored plastic, rubber, carbon fiber, composition material, metal (e.g., stainless steel), glass, ceramic, and/or organic material. The first annular ring 703 preferably has a first height measured between the ring 703 and the base 101. The second annular ring 701 preferably has a second height measured between the ring and the base 101. The first and second rings 701, 703 are preferably configured to provide a bartender visual measuring guides. For example, the first ring 703 is configured to allow a bartender to fill the container 105 with ice and drink ingredients up to the first ring 703 in order accurately mix and pour a certain drink, for example, a shot. The second ring is configured to allow a bartender to fill the container 105 with ice and drink ingredients up to the second ring 701 in order to accurately mix and pour a different drink, for example, a martini. Additionally, the first and or second rings 701, 703 facilitate the stacking of multiple shakers 700 in order to simultaneously pour a drink from each shaker 700.

Turning now to FIG. 9, another embodiment of a drink shaker 800 is shown including a container 105 and one or more measuring structures here embodied as two protrusions 801, 803. The protrusions 801, 803 preferably extend from an interior surface of the container 105 and include tabs, nubs, fingers, columns, extensions, bumps, or any structure that extends from an interior surface of the container 105. In other embodiments, a container includes instead of, or in addition to the protrusions 801, 803, grooves, ditches, pits, notches, indentations, apertures, openings, or ruts. The height of the protrusions 801, 803 is preferably configured to facilitate accurate drink pours as well as flair bartending tricks, for example, a multiple shaker pour.

FIG. 10 shows another embodiment of a drink shaker 900 including a double walled container 910. The double walled container 910 includes an interior wall 903 and an exterior wall 901 that extend from a base 101. The interior wall 903 contains one or more measuring structures here embodied as two or more upper bumps 905 and two or more lower bumps 907. The upper and lower bumps 905, 907 are preferably configured to aid the stacking of multiple shakers 900 on top of one another and/or to act as visual measuring guides for a bartender. The bumps 905, 907 are formed by contours in the interior wall 903 or are separate structures that are added to the interior wall 903.

Figure 11A:
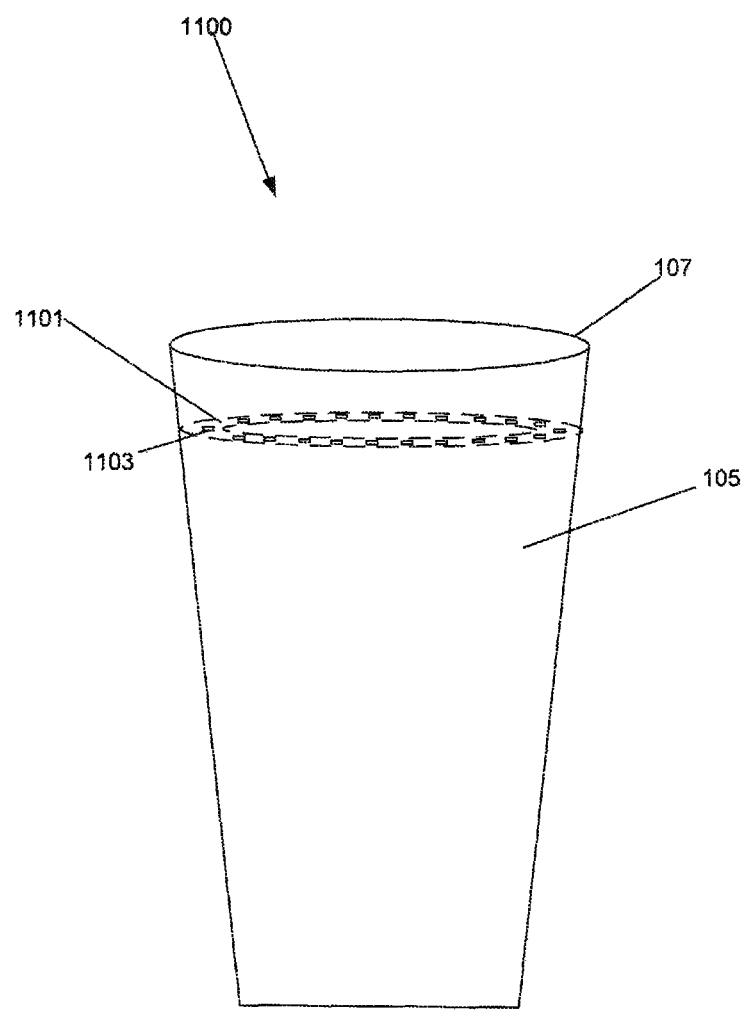
FIG. 11A is a side view schematically illustrating an embodiment of a shaker including a straining rim.

FIG. 11A shows another embodiment of a drink shaker 1100 including a straining rim 1101 that extends from the interior surface of the container 105. The straining rim 1101 preferably comprises an annular ring or any other shaped structure that extends from the interior surface of the container 105. The straining rim 1101 preferably extends in a plane at least substantially parallel to the plane of the lip 107. The location of the straining rim 1101 may vary. In some embodiments, the straining rim 1101 is disposed between about 0.25 inch and about 1.25 inches from the lip 107 of the container 105. The width of the straining rim 1101 may vary. In some embodiments, the straining rim 1101 extends from the interior surface of the container 105 between about 0.25 inch and about 1 inch.

Figure 11B:
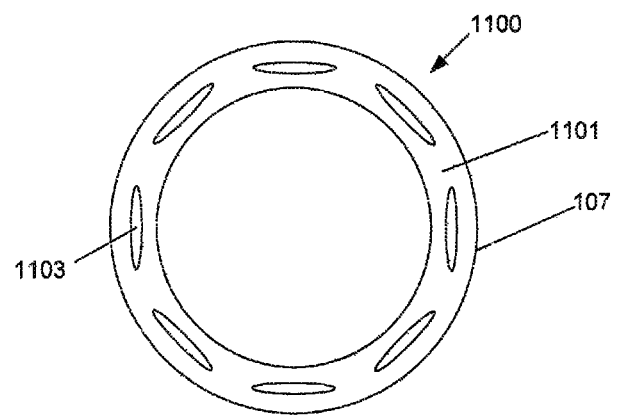
FIG. 11B is a top view schematically illustrating an embodiment of a shaker including a straining rim.
Figure 11C:
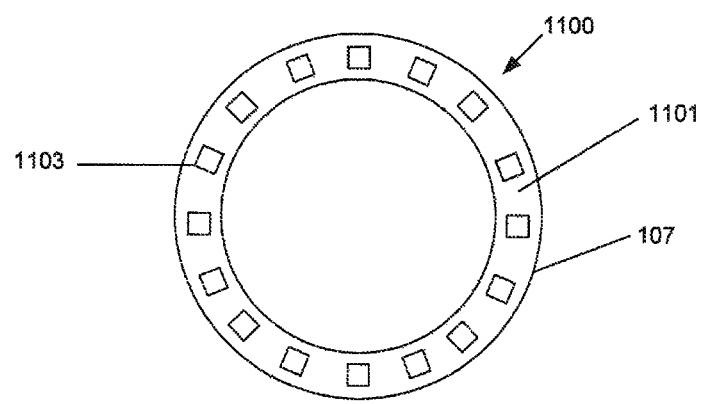
FIG. 11C is a top view schematically illustrating an embodiment of a shaker including a straining rim.

As shown in FIGS. 11B and 11C, in some embodiments, the straining rim 1101 includes one or more openings, slits, holes, apertures, vents, or slots 1103 configured to allow liquid to pass through the rim 1101 while straining ice or large objects from passing through the rim 1101 into a glass. The openings 1101 are various shapes and sizes. For example, in one embodiment, the openings 1103 are generally polygonal with a certain area. In another embodiment, the openings 1103 are generally curvilinear. In one embodiment, the openings 1103 are not all the same shape. In another embodiment, each opening 1103 is an elongated vent or slit with a certain area. The size of each opening 1103 may vary. In some embodiments, the shape and size of each opening 1103 is configured to strain certain objects, for example, ice and/or fruit seeds. In one embodiment, the size of each opening 1103 is configured to regulate the rate of flow out of the shaker 1100.

In operation, a bartender inserts the opening of a cup or glass into the shaker 1100 until the opening of the cup or glass is seated upon the rim 1101. The bartender then holds the cup and shaker 1100 together to mix the ingredients within the shaker 1100 and then pours the mixed drink from the shaker 1100 by passing the drink through the openings 1103. Thus, in some embodiments, the rim 1101 is used to strain ice from a drink and also to provide a seat for a glass or cup in order to prevent the glass or cup from getting lodged within the container 105. In some embodiments, a rim 1101 is included in a container 105 that also includes one or more measuring structures, for example, a post. In one embodiment, the rim 1101 is disposed a certain distance from the lip 107 such that the rim 1101 is used as a measuring structure in addition to a strainer and seat for a cup. In some embodiments, the rim 1101 is used to ensure clearance between containers 105 when shakers are stacked on top of one another to facilitate multiple pours.

Figure 12:
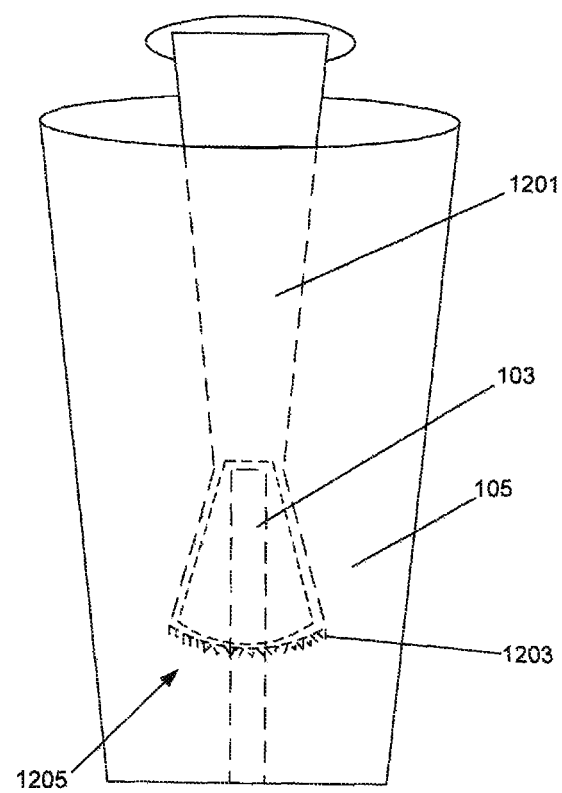
FIG. 12 is a side view schematically illustrating the drink shaker shown in FIG. 1 with a muddler.

FIG. 12 shows the drink shaker 100 shown in FIG. 1 paired with a muddler 1201. A muddler is a bartender's tool that is used like a pestle to mash or muddle ingredients in a container to release their flavor. The muddler 1201 may be any shape, for example, an elongated cylinder. The muddler 1201 may be made of any suitable material, for example, metal, plastic, rubber, wood, and fiberglass. The muddler 1201 preferably includes muddling elements 1203 extending at one end of the muddler 1101. The muddling elements 1203 are preferably configured to muddle ingredients within the container 105. The muddling elements may include, for example, teeth, points, protrusions, tips, barbs, or similar structure.

Figure 13:
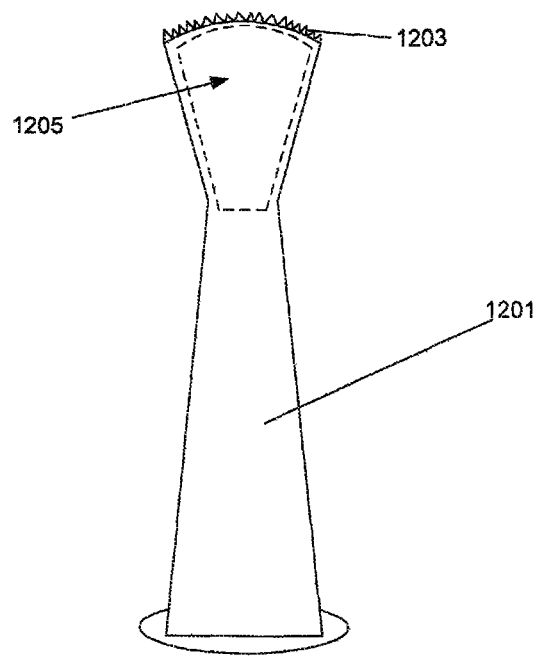
FIG. 13 is a side view schematically illustrating the muddler shown in FIG. 12.

As shown in FIG. 13, in some embodiments, the muddler 1201 includes a cavity (or jigger) 1205 disposed at one end. The cavity 1205 is preferably configured to receive a certain amount of matter, for example, an alcoholic beverage. The inside of the cavity 1205 preferably includes measuring guides or structure to provide a bartender with a visual guide to fill the muddler with a certain amount of matter. For example, in one embodiment the cavity 1205 includes a measuring guide to provide a visual guide for a bartender to fill the cavity with 2 fluid ounces of liquid. In another embodiment, the cavity 1205 includes a first measuring guide providing a visual guide to a bartender to fill the cavity with 2 fluid ounces and a second measuring guide providing a visual guide to a bartender to fill the cavity with 1.25 fluid ounces. Thus, the muddler 1201 may be used alone, or in conjunction with a shaker 100 to facilitate accurate pours. Additionally, when used with a shaker 100, the cavity 1205 is preferably configured to receive at least a portion of the measuring structure 103 allowing the muddling elements 1203 to muddle ingredients closer to the base 101.

Figure 14:
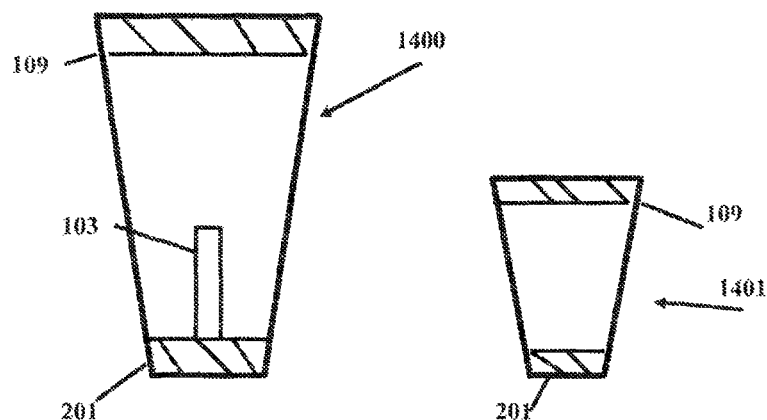
FIG. 14 is front plan view of a combination shaker and short tin.
Figure 15:
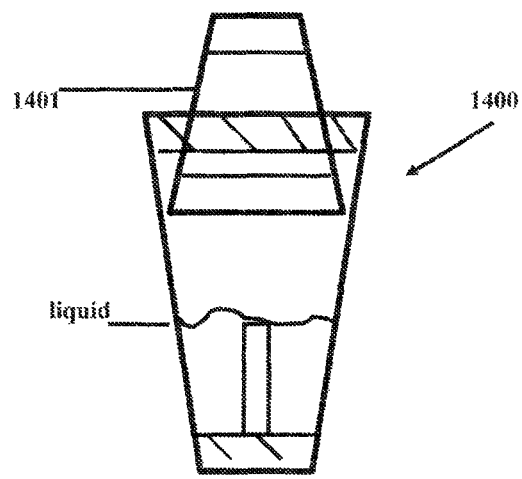
FIG. 15 is front plan view of a combination shaker and short tin with the short tin inverted and inserted into the top of the shaker to create a seal.
Figure 16:
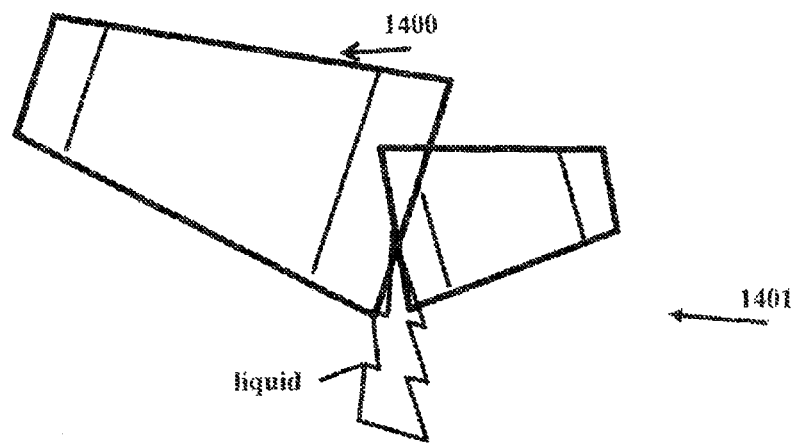
FIG. 16 is front plan view of a combination shaker and short tin being used to pour a drink.

As shown in FIGS. 14-16, a shaker 1400 is combined with a short tin 1401. In this embodiment, both the shaker 1400 and the short tin 1401 preferably have color coded rims. Alternatively, the shaker 1400 and the short tin 1401 have stainless steel rims. Alternatively, the shaker 1400 and the short tin 1401 have a rubber coating to allow for optimum gripping by a bartender performing flair bartending. The short tin 1401 is preferably half of the size of the shaker 1400. The short tin 1401 is preferably inverted and inserted into the top of the shaker 1400, creating a temporary seal and allowing for liquid within the shaker 1400 to be shaken. Once the liquid is well shaken, the seal between the shaker 1400 and the short in 1401 is cracked and the liquid is poured into a drinking glass.

Figure 17:
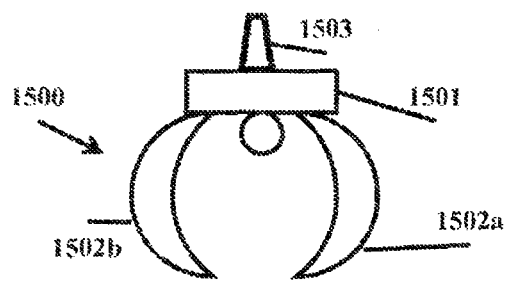
FIG. 17 is a top plan view of a holder for a muddler.
Figure 18:
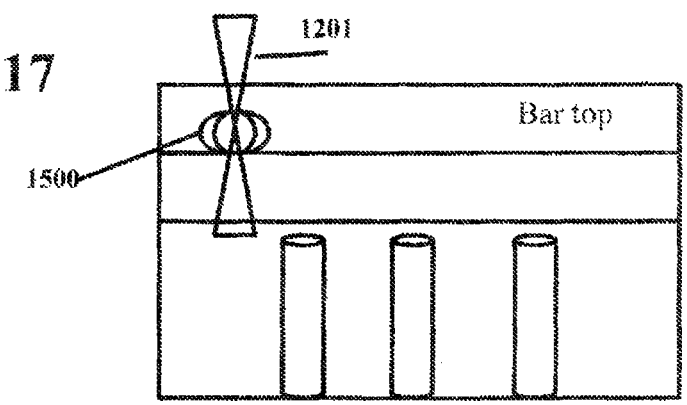
FIG. 18 is a front plan view of a bar with a holder attached to a bar top and a muddler placed within the holder.

In another embodiment shown in FIGS. 17 and 18, a holder 1500 for a muddler 1201 is preferably composed of a mounting bracket 1501 with arms 1502*a-b*. The holder 1500 is preferably composed of a metal material and can be magnetically attached to a bar top. Alternatively, the holder 1500 is composed of a plastic material and is attached to a bar top with a screw 1503.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

We claim as our invention:

1. A precision pour drink shaker for mixing liquids, the precision pour drink shaker comprising:
   a base having a first diameter and comprising an interior surface and an exterior surface;
   a lower portion formed of a stainless steel material, the lower portion comprising a proximate edge coupled to the base and a distal edge, the lower portion having an interior surface and an exterior surface;
   a middle portion formed of a transparent material, the middle portion comprising a proximate edge coupled to the distal edge of the base and a distal edge, the middle portion having an interior surface and an exterior surface;
   a top portion formed of a stainless steel material, the top portion comprising a proximate edge coupled to the distal edge of the middle portion and a distal edge that defines an opening opposite the base, the top portion having an interior surface and an exterior surface; and
   a single post extending from the interior surface of the base, the single post having a second diameter that is less than the first diameter, and a tip, the tip being disposed between the distal and proximate edges of the middle portion;
   wherein the base, the lower portion, the middle portion and the top portion define a single interior chamber for the precision pour drink shaker for containing liquids with the single post extending upward in the single interior chamber;
   wherein a height of the middle portion is greater than a combined height of the lower portion and the top portion.

2. The precision pour drink shaker system according to claim 1 wherein the side-wall comprises a spout.

3. The precision pour drink shaker system according to claim 1 wherein the first height is about 7 inches and the second height it about 3.75 inches.

4. A precision pour drink shaker for mixing liquids, the precision pour drink shaker comprising:
   a base having a first diameter ranging from about 2 inches to about 5 inches and the base comprising an interior surface and an exterior surface;
   a lower portion formed of a stainless steel material, the lower portion comprising a proximate edge coupled to the base and a distal edge, the lower portion having an interior surface and an exterior surface;
   a middle portion formed of a transparent plastic material, the middle portion comprising a proximate edge coupled to the distal edge of the base and a distal edge, the middle portion having an interior surface and an exterior surface;
   a top portion formed of a stainless steel material, the top portion comprising a proximate edge coupled to the distal edge of the middle portion and a distal edge that defines an opening opposite the base, the top portion having an interior surface and an exterior surface; and
   a single post extending from the interior surface of the base, the single post having a second diameter and a tip, the tip being disposed between the distal and proximate edges of the middle portion, the post composed of a stainless steel material;
   wherein the base, the lower portion, the middle portion and the top portion define a single chamber for the precision pour drink shaker for containing liquids with the single post extending upward in the single interior chamber;
   wherein a height of the middle portion is greater than a combined height of the lower portion and the top portion.

5. A precision pour drink shaker for mixing liquids, the precision pour drink shaker comprising:
   a base having a first diameter and comprising an interior surface and an exterior surface;

a lower portion comprising a proximate edge coupled to the base and a distal edge, the lower portion having an interior surface and an exterior surface;

a middle portion formed of a transparent material, the middle portion comprising a proximate edge coupled to the distal edge of the base and a distal edge, the middle portion having an interior surface and an exterior surface;

a top portion comprising a proximate edge coupled to the distal edge of the middle portion and a distal edge that defines an opening opposite the base, the top portion having an interior surface and an exterior surface; and a single post extending from the interior surface of the base, the single post having a second diameter that is less than the first diameter, and a tip, the tip being disposed between the distal and proximate edges of the middle portion;

wherein the base, the lower portion, the middle portion and the top portion define a single interior chamber for the precision pour drink shaker for containing liquids with the single post extending upward in the single interior chamber;

wherein a height of the middle portion is greater than a combined height of the lower portion and the top portion.

* * * * *